(12) United States Patent
Vegliante

(10) Patent No.: US 12,137,729 B2
(45) Date of Patent: Nov. 12, 2024

(54) SMOKING FILTER

(71) Applicant: Snap Wrap, LLC, Sarasota, FL (US)

(72) Inventor: Paul Vegliante, Sarasota, FL (US)

(73) Assignee: Snap Wrap, LLC, Sarasota, FL (US)

(*) Notice: Subject to any disclaimer, the term of this patent is extended or adjusted under 35 U.S.C. 154(b) by 344 days.

(21) Appl. No.: 17/340,437

(22) Filed: Jun. 7, 2021

(65) Prior Publication Data
US 2021/0378291 A1 Dec. 9, 2021

Related U.S. Application Data

(60) Provisional application No. 63/035,248, filed on Jun. 5, 2020.

(51) Int. Cl.
| | |
|---|---|
| *A24D 3/04* | (2006.01) |
| *A24D 3/06* | (2006.01) |
| *A24D 3/16* | (2006.01) |
| *A24F 1/30* | (2006.01) |
| *A24F 7/04* | (2006.01) |

(52) U.S. Cl.
CPC .............. *A24D 3/048* (2013.01); *A24D 3/062* (2013.01); *A24D 3/163* (2013.01); *A24F 1/30* (2013.01); *A24F 7/04* (2013.01)

(58) Field of Classification Search
None
See application file for complete search history.

(56) References Cited

U.S. PATENT DOCUMENTS

| 2011/0186064 A1 | 8/2011 | Patel |
| 2012/0167903 A1* | 7/2012 | Capasso .................. A24F 1/30 |
| | | 131/331 |
| 2017/0105447 A1 | 4/2017 | Gay |
| 2018/0368401 A1 | 12/2018 | Swamy et al. |

FOREIGN PATENT DOCUMENTS

| AU | 2003100841 B4 | 3/2004 |
| WO | WO01/97641 A1 | 12/2001 |
| WO | 2014/076597 A2 | 5/2014 |

OTHER PUBLICATIONS

International Search Report of the International Searching Authority mailed on Sep. 15, 2021, issued in connection with International Application No. PCT/US21/36110 (3 pages).
(Continued)

*Primary Examiner* — Dennis R Cordray
(74) *Attorney, Agent, or Firm* — McCarter & English, LLP (57) ABSTRACT

The present disclosure relates to a filter for a smoking device, such as, but not limited to, a water pipe. The filter includes a body that is positionable over a mouthpiece of the smoking device, to filter impurities from smoke drawn therethrough, and a base that secures the body over the mouthpiece such that smoke is drawn therethrough, prior to inhalation by a user. The body can include one of more filtration layers, such as a first layer formed from a material selected to filter carcinogens and other impurities from the smoke prior to inhalation, and a second layer formed from a material selected to minimize or prevent the transmission of bacteria, viruses, or other contagions from a user's mouth to the smoking device. Each of the filtration layers can also be formed from one or more materials.

28 Claims, 5 Drawing Sheets

(56) References Cited

OTHER PUBLICATIONS

Written Opinion of the International Searching Authority mailed on Sep. 15, 2021, issued in connection with International Application No. PCT/US21/36110 (8 pages).

"Bacterial Contamination of Cannabis Pipes and How to Avoid Sharing Germs," published by Moose Labs LLC, May 2019 (22 pages).

Extended European Search Report dated Jun. 18, 2024, issued by the European Patent Office in connection with European Application No. 21818364.8 (8 pages).

\* cited by examiner

SMOKING FILTER

CROSS-REFERENCE TO RELATED APPLICATIONS

This application claims the benefit of U.S. Provisional Patent Application No. 63/035,248, filed Jun. 5, 2020, the entire disclosure of which is hereby expressly incorporated by reference.

BACKGROUND

Field of the Disclosure

The present disclosure relates to a filter for a smoking apparatus.

Related Art

Water pipes, and other smoking paraphernalia, such as bongs, use water to filter and cool smoke prior to inhalation. However, not all particles are filtered by water. Other smoking paraphernalia, such as pipes and bowls, contain no filters. Further, such smoking paraphernalia is often shared among people, potentially leading to transmission of contagions from one person to another.

SUMMARY

The present disclosure relates to a smoking filter for a water pipe and other smoking devices. The smoking filter includes a body having one or more filter layers that can be positioned over an open top of the water pipe and an elastic base sized to fit about an open top of the water pipe in order to secure the body of the filter to the top of the water pipe. The filter has a first, generally flat, configuration for positioning inside a package for sale and storage, and a second, deployed, configuration for positioning the body over the open top of the water pipe and the elastic base positioned about the side wall of the open top to secure the body to the open top. The body of the smoking filter can exceed the size of the open top of the water pipe and have a plurality of filter layers comprising various materials. For example, the body can be formed from a woven and a non-woven material and can comprise one or more filter agents, such as charcoal. According to another example, the smoking filter can include a first layer formed from a material that filters carcinogens and other impurities from the smoke prior to inhalation and a second layer formed from a material that minimizes or prevents transmission of bacteria, viruses, or other contagions from a user's mouth to the water pipe. A layer can include an antimicrobial material such as a metal coating of silver and copper. One or more layers, or a portion of one or more layers can comprise an N95 filter or other filter materials such as a face mask filter.

The smoking filter can include a body having one or more filter layers, a first generally planar portion, and a central portion that extends from the planar portion into the open top of the water pipe and an elastic base sized to fit about the open top of the water pipe to secure the body of the filter on the open top. The central portion is inserted into the pipe and can be, for example, conical, frustoconical, cylindrical etc.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to smoking filters for water pipes and other smoking devices, as discussed in detail below in connection with FIGS. 1-7.

Figure 1:
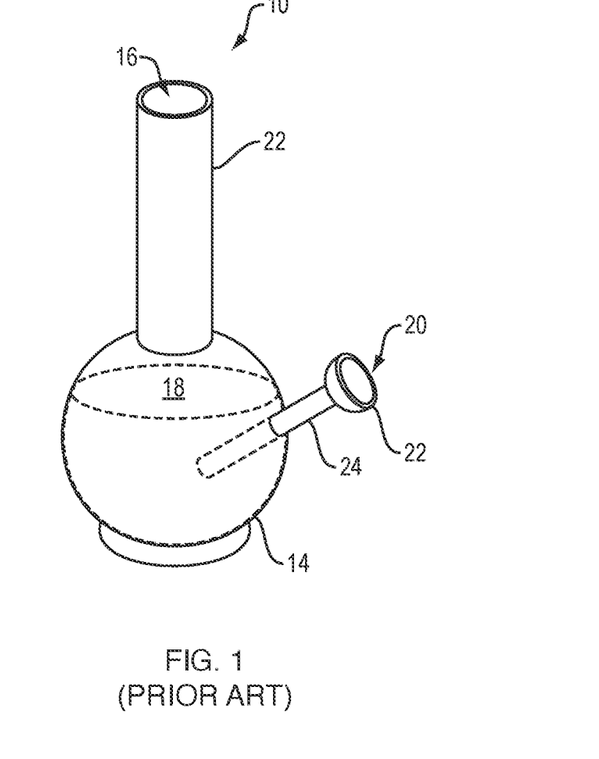
FIG. 1 is a perspective view of a water pipe.

FIG. 1 is a perspective view of a water pipe 10 as known in the prior art. The water pipe 10 includes a cylindrical body 12 having a bottom 14 holding an amount of water 18 and an open top 16, which can serve as a mouthpiece. A bowl portion 20 includes a receptacle 22 for receiving tobacco or marijuana or other combustible substance to be smoked. A hollow tube 24 extends from the receptacle 22 to the interior of the body 12 at the bottom 14 where the water 18 is held. In operation, the combustible substance is exposed to a heat source (e.g., a flame), a smoker's mouth is placed over the open top 16, and the smoker inhales to draw smoke from the receptacle 22, through the stem 24, percolating up through the water 18, up the cylindrical body 12 and into the mouth of the smoker.

Figure 2:
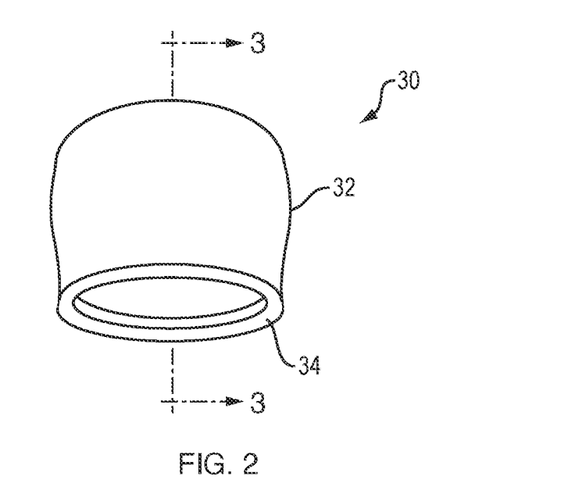
FIG. 2 is a perspective view of a filter for the water pipe.
Figure 3:
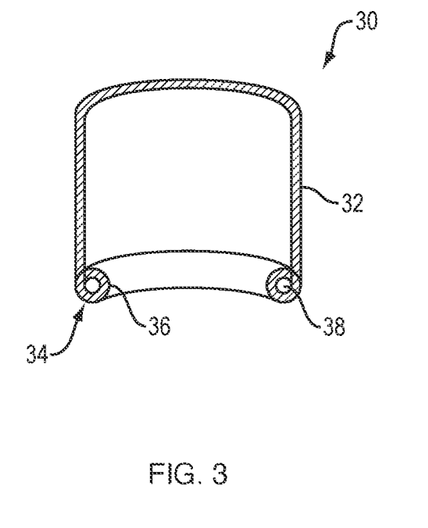
FIG. 3 is a cross-sectional view of the filter shown in FIG. 2 taken along lines 3-3.
Figure 4:
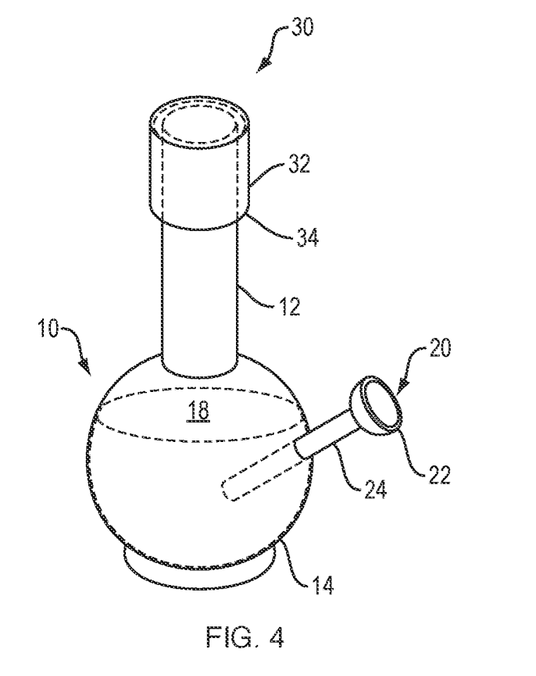
FIG. 4 is a perspective view of the filter on a water pipe.

FIG. 2 shows a perspective view of an exemplary filter 30 of the present disclosure in the form of a cover for the open top 16 of the water pipe 10. FIG. 3 is a cross-sectional view of the filter shown in FIG. 2, taken along the lines 3-3. The filter 30 includes a body 32 and a base 34. As shown in FIG. 4, the filter 30 fits over the water pipe 10, or other pipe such that the body 32 covers the open top 16 and the base 34 secures the filter 30 to the cylindrical body 12 of the water pipe 10. The filter can be sized to fit the water pipe, or it can be loose to fit many sizes.

The body 32 of the filter 30 can be made of any material that permits air to pass through but helps to remove tar and other materials in smoke to help minimize the amount of tar and other materials inhaled by a person. The filter material can also minimize the transmission of pathogens by preventing the passing of such pathogens from one person's mouth to the smoking implement and to a next person's mouth. The filter material could be made of any suitable, protective material or a combination of materials. The filter could be formed from a woven or non-woven material. It could be made of nylon, for example, a nylon stocking material. The filter could also be made of cotton or any suitable synthetic material, such as a plastic material having a sufficiently fine air throughput to filter tar and other impurities from smoke, and to prevent the transmission of pathogens, but to allow smoke to be inhaled therethrough. A charcoal or charcoal impregnated filter can be included to increase filtering. There is a limit on the level of filtration in that if the level of filtration is too high, it will be difficult for a user to draw smoke through the filter. The filter 30 can have sufficient play such that it can be moved about the open end of a pipe so a user can position an unused portion at the end of the pipe for use.

The filter 30 could be formed from one layer. Such a single layer could filter and decrease or remove tar and protect against pathogens. Alternatively, the filter 30 could be formed of a plurality of layers, with one or more materials for each layer being selected to perform a specific function. For example, a first layer could be formed from a material selected to perform the function of filtering carcinogens and other impurities from the smoke prior to inhalation. A second layer could be formed from a material selected to perform the function of minimizing or preventing transmission of bacteria, viruses, or other contagions from a user's mouth to the smoking paraphernalia, or conversely, from the smoking paraphernalia to the user's mouth. Suitable materials for the second layer can include, but are not limited to, antimicrobial/antibacterial materials and coatings, such as silver and copper.

The filter 30 could have a number of different components. For example, the side walls of the filter could be made of a soft rubber or plastic material, such as a pvc material, pvc film, or other material, to engage or stick to the side wall of the water pipe. The filter media could be a different material, such as paper, a non-woven material, or other filter materials, joined to the side walls of the filter. The filter could be hard or soft. A hard cap made of glass or plastic or other rigid material can be placed on the water pipe and the hard cap can have a filter media. The filter media could be removable and replaceable on a hard cap, or the hard cap and filter media together could be removed from the pipe and replaced after use. Any suitable material can be used to retain the filter or cap on the water pipe. For example, a material that can cling to the outer surface of the pipe can be used to retain the filter or cap on the pipe. A non-permanent adhesive can be used, as can rubber bands, or any material that functions like a rubber band and can exert pressure on the exterior of the pipe and/or can cling to, or adhere to, the exterior of the pipe. Tape can be used to attach the filter or cap to a water pipe, as can any material that can function like a rubber band, for example, a nylon material. As such, the filter can be comprised entirely of the filter media, or the filter can include filter media and other components.

The base 34 of the filter 30 can be made of any suitable material for retaining the filter on a water pipe or other smoking device. The base 34 can be made of an elastic material 38 that can be stretched over the body of the pipe to retain the filter 30 on the pipe. For example, an elastic material 38, such as a rubber band, can be attached about an edge of the filter 30. The edge of the body 32 of the filter 30 can be wrapped around the elastic material 38 or rubber band and sewn or otherwise attached to itself to form a pocket 36 enclosing the elastic material 38 about the edge of the filter 30. The base could additionally or alternatively include an adhesive to adhere the filter to adhere the filter to a pipe. The adhesive could be a light adhesive or releasable adhesive or a tacky material or a tack agent to hold the filter in place on a pipe.

In use, one can place the filter 30 on a water pipe 10 as shown in FIG. 4. One can then use the water pipe. When a person is finished using the pipe, the filter can be removed. Another person can then place another filter on the water pipe and use the water pipe. The filter 30 helps to minimize the likelihood of one person passing pathogens to another person because people are contacting their mouths with a filter and not directly with pipe. The filter 30 can also filter tar and other materials in the smoke to help minimize the amount of tar and other materials inhaled by a person.

The filter 30 can be sized for its intended use. For example, the filter 30 could be produced in a number of sizes such as a small size for a pipe and a larger size for a bong. The filter 30 could be packaged such that one filter is individually packaged in a single, conveniently-sized package. For example, the filter 30 could be transported or sold in individual prophylactic type packages where they are easy to carry in a wallet or purse. A box could contain multiple filters packaged in this manner.

Figure 5:
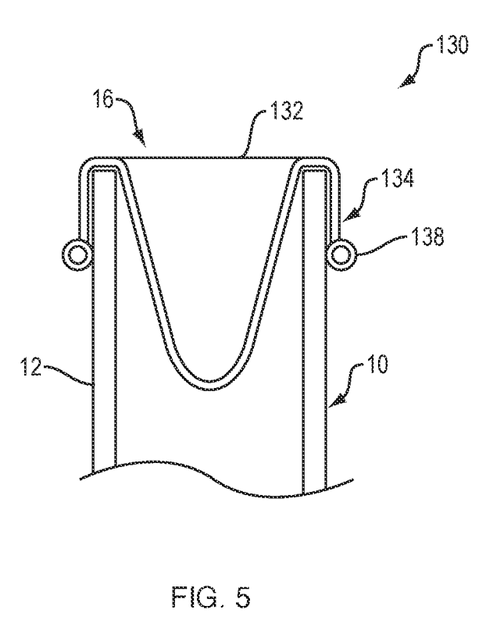
FIG. 5 is a cross-sectional view of another filter according to the present disclosure positioned on a water pipe.

FIG. 5 is a partial cross-sectional view of another filter 130 of the present disclosure, positioned on the pipe of FIG. 1. The filter 130 includes a generally conical or frustoconical body 132 formed from a filtration media attached to a cylindrical collar 134. The filter 130 fits over the water pipe 10 such that the body 132 covers the open top 16 and at least partially extends into the cylindrical body 12 of the pipe 10 and the cylindrical collar 134 secures the filter 130 to the cylindrical body 12 of the water pipe 10. As shown, the generally conical or frustoconical body 132 of the filter 130 provides for a filtration media surface area that is greater than the area of the open top 16 of the pipe 10. Accordingly, tar and other materials in smoke drawn through the open top 16 of the pipe 10 are filtered through the larger filtration media surface area of the body 132, thereby providing for improved filtration and an enhanced user experience.

The body 132 of the filter 130 can be made of any filtration media that permits air to pass through but helps to remove tar and other materials in smoke, to help minimize the amount of tar and other materials inhaled by a person. The cylindrical collar 134 of the filter 130 can be made of any suitable material for retaining the filter 130 on the water pipe 10 or other smoking device. For example, as shown in FIG. 5, the cylindrical collar 134 can be made from the same filtration media as the body 132 and can be integrally formed therewith. The cylindrical collar 134 can also include a retaining ring 138 attached about an edge of the filter 130 that can be stretched over the body 12 of the pipe 10 to retain the filter 130 on the pipe 10. The retaining ring 138 can be formed from a resiliently deformable or elastic material, such as elastic or a rubber band, so that the collar 134 of the filter 130 can stretched to accommodate a variety of smoking devices having different sizes and configurations.

Figure 6:
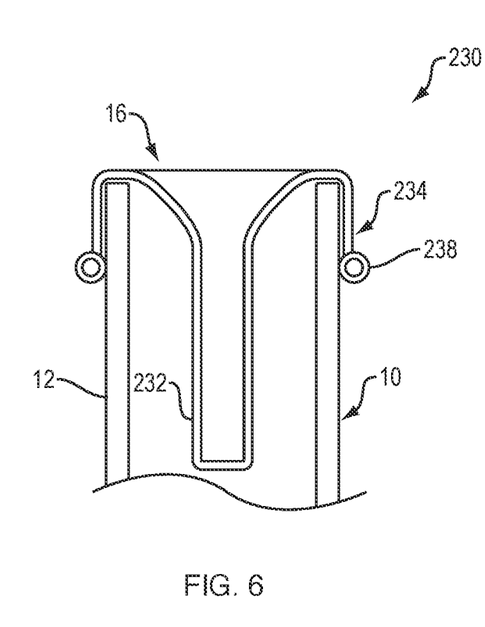
FIG. 6 is a cross-sectional view of another filter according to the present disclosure positioned on a water pipe.

FIG. 6 is a partial cross-sectional view of another filter 230 of the present disclosure, positioned on a pipe. The filter 230 includes a generally cylindrical, or tubular, body 232 formed from a filtration media and a cylindrical collar 234 extending therefrom. The filter 230 fits over the water pipe 10 such that the body 232 covers the open top 16 and at least partially extends into the cylindrical body 12 of the pipe 10 and the cylindrical collar 234 secures the filter 230 to the cylindrical body 12 of the water pipe 10. As shown, the generally cylindrical body 232 of the filter 230 provides for a filtration media surface area that is greater than the area of the open top 16 of the pipe 10. Accordingly, tar and other materials in smoke drawn through the open top 16 of the pipe 10 are filtered through the larger filtration media surface area of the body 232, thereby providing for improved filtration and an enhanced user experience.

The body 232 of the filter 230 can be made of any filtration media that permits air to pass through but helps to remove tar and other materials in smoke, to help minimize the amount of tar and other materials inhaled by a person. The cylindrical collar 234 of the filter 230 can be made of any suitable material for retaining the filter 230 on the water pipe 10 or other smoking device. For example, as shown in FIG. 6, the cylindrical collar 234 can be made from the same filtration media as the body 232 and can be integrally formed therewith. The cylindrical collar 234 can also include a retaining ring 238 attached about an edge of the filter 230 that can be stretched over the body 12 of the pipe 10 to retain the filter 230 on the pipe 10. The retaining ring 238 can be formed from a resiliently deformable or elastic material, such as a rubber band, so that the collar 234 of the filter 230 can stretched to accommodate a variety of smoking devices having different sizes and configurations.

Figure 7:
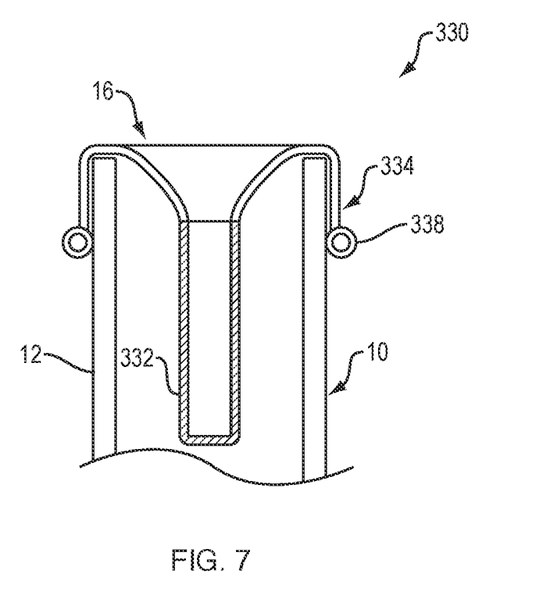
FIG. 7 is a cross-sectional view of another filter according to the present disclosure formed from first and second materials.

FIG. 7 is a partial cross-sectional view of another filter 330 of the present disclosure, positioned on the pipe of FIG. 1. The filter 330 includes a generally cylindrical, or tubular, body 332 formed from a filtration media and a cylindrical collar 334 extending about the filtration media. The filter 330 fits over the water pipe 10 such that the body 332 covers the open top 16 and at least partially extends into the cylindrical body 12 of the pipe 10 and the cylindrical collar 334 secures the filter 330 to the cylindrical body 12 of the water pipe 10. As shown, the generally cylindrical body 332 of the filter 330 provides for a filtration media surface area that is greater than the area of the open top 16 of the pipe 10. Accordingly, tar and other materials in smoke drawn through the open top 16 of the pipe 10 are filtered through the larger filtration media surface area of the body 332, thereby providing for improved filtration and an enhanced user experience.

The components of the filter 330, as well as the various filtration media described herein, can be formed from one or more materials. For example, as shown in FIG. 7, the body 332 of the filter 330 can be formed from a first material and the cylindrical collar 334 can be formed from a second material. Specifically, the body 332 can be formed from a rigid or semi-rigid material, N95 filtration media, other medical-grade filtration media, or another filtration media that permits air to pass through but helps to remove tar and other materials in smoke, in order to help minimize the amount of tar and other materials inhaled by a person. The cylindrical collar 334 of the filter 330 can be made of filter media such as N95 filtration media, or other media, or it could be made of an impermeable elastic membrane, or web material, or other suitable material for retaining the filter 330 on the water pipe 10 or other smoking device. The cylindrical collar 334 can also include a retaining ring 338 attached about an edge of the filter 330 that can be stretched over the body 12 of the pipe 10 to retain the filter 230 on the pipe 10. The retaining ring 338 can be formed from a resiliently deformable or elastic material, such as a rubber band, so that the collar 334 of the filter 330 can stretched to accommodate a variety of smoking devices having different sizes and configurations. It should also be understood that the body 332, the cylindrical collar 334, and/or the retaining ring 338 can be made from the same material (e.g., filtration media) as the body 332 and can be formed as an integral component.

Having thus described the filter in detail, it is to be understood that the foregoing description is not intended to limit the spirit or scope thereof. It will be understood that the present disclosure described herein is merely exemplary and that a person skilled in the art may make any variations and modification without departing from the spirit and scope of the disclosure. All such variations and modifications, including those discussed above, are intended to be included within the scope of the disclosure.

What is claimed is:

1. A filter for a smoking device, comprising:
 a body having one or more filter layers positionable over a mouthpiece of a smoking device to filter impurities from smoke drawn through the body;
 a resiliently deformable base configured to secure the body over the mouthpiece such that smoke is drawn through the body prior to inhalation by a user; and
 a flat package for selling and storing the filter.

2. The filter of claim 1, wherein the body is comprised of a woven and a non-woven material.

3. The filter of claim 1, wherein the base comprises an elastic ring secured about a lower edge of the body, the lower edge of the body being wrapped around the elastic ring.

4. The filter of claim 1, wherein the body comprises:
 a first filter layer formed from a material selected to perform the function of filtering carcinogens and other impurities from the smoke prior to inhalation; and
 a second filter layer formed from a material selected to perform the function of minimizing or preventing transmission of bacteria, viruses, or other contagions from a user's mouth to the smoking device.

5. The filter of claim 4, wherein the second filter layer comprises an antimicrobial material including one or more of silver and copper.

6. The filter of claim 1, wherein the base comprises a cylindrical collar and a retaining ring, the cylindrical collar sized to extend about a sidewall of the mouthpiece of the smoking device, and the retaining ring bearing against the sidewall of the mouthpiece to retain the body over the mouthpiece of the smoking device.

7. The filter of claim 6, wherein the retaining ring is formed from an elastic material such that the base can be stretched to accommodate smoking devices having different sizes and configurations.

8. The filter of claim 6, wherein the body comprises a central portion that extends from the collar into the mouthpiece of the smoking device.

9. The filter of claim 1, having a plurality of filter layers.

10. A smoking filter for a water pipe comprising:
 a body having a plurality of filter layers for positioning over a mouthpiece of the water pipe; and
 an elastic base sized to fit about a side wall defining the mouthpiece to secure the body of the filter on the the mouthpiece.

11. The filter of claim 10, further comprising a package for the filter, the filter having:
 a first, generally flat, configuration for positioning inside the package for sale and storage and
 a second, deployed, configuration for positioning the body over the mouthpiece of the water pipe and the elastic base positioned about a side wall of the mouthpiece of the water pipe to secure the body to the water pipe.

12. The filter of claim 10, wherein the body exceeds the size of the mouthpiece of the water pipe.

13. The filter of claim 10, wherein the body is comprised of a woven and a non-woven material.

14. The filter of claim 13, further comprising one or more filter agents.

15. The filter of claim 14, wherein the one or more filter agents is charcoal.

16. The filter of claim 10, further comprising:
 a first layer formed from a material to filter carcinogens and other impurities from the smoke prior to inhalation; and
 a second layer formed from a material to minimize transmission of bacteria, viruses, or other contagions from a user's mouth to an the mouthpiece of the water pipe.

17. The filter of claim 16, wherein the second layer includes an antimicrobial material.

18. The filter of claim 17, wherein the antimicrobial material is a metal coating of silver and copper.

19. The filter of claim 10, wherein the body comprises a central portion that extends from the collar into the mouthpiece of the smoking device.

20. The filter of claim 19, wherein the central portion is formed from a rigid or semi-rigid material and is integrally formed with the collar.

21. The filter of claim 10, wherein the filter can be moved about the mouthpiece to provide unused portions for use.

22. The filter of claim 10, wherein the filter layers filter carcinogens and impurities from smoke and minimize transmission of carcinogens.

23. A smoking filter for a water pipe, comprising:
   a body having one or more filter layers for positioning over a mouthpiece of the water pipe, the body having:
      a first generally planar portion; and
      a central portion that extends from the generally planar portion into the mouthpiece of the water pipe; and
   an elastic base sized to fit about a side wall of the mouthpiece to secure the body of the filter on the mouthpiece of the water pipe.

24. The smoking filter of claim 23 wherein the base includes elastic.

25. The smoking filter of claim 23 wherein the base includes an adhesive.

26. The smoking filter of claim 23, wherein the central portion is conical.

27. The smoking filter of claim 23, wherein the central portion is cylindrical.

28. The smoking filter of claim 23 further comprising a first filter material at a central portion of the body and a second material around a periphery of the body.

* * * * *

UNITED STATES PATENT AND TRADEMARK OFFICE
CERTIFICATE OF CORRECTION

| | | |
|---|---|---|
| PATENT NO. | : 12,137,729 B2 | Page 1 of 1 |
| APPLICATION NO. | : 17/340437 | |
| DATED | : November 12, 2024 | |
| INVENTOR(S) | : Vegliante | |

It is certified that error appears in the above-identified patent and that said Letters Patent is hereby corrected as shown below:

In the Claims

In Column 6, Line 35, Claim 10, the third instance of the word "the" should be deleted.

In Column 6, Line 60, Claim 16, the word "an" should be deleted.

Signed and Sealed this
Seventeenth Day of December, 2024

Derrick Brent
*Acting Director of the United States Patent and Trademark Office*